United States Patent
Ogawa et al.

(10) Patent No.: US 6,791,953 B2
(45) Date of Patent: Sep. 14, 2004

(54) INTERFACE APPARATUS

(75) Inventors: Makoto Ogawa, Kanagawa (JP);
Tetsuya Hashimoto, Kanagawa (JP)

(73) Assignee: NEC Electronics Corporation,
Kawasaki (JP)

(*) Notice: Subject to any disclaimer, the term of this patent is extended or adjusted under 35 U.S.C. 154(b) by 0 days.

(21) Appl. No.: 10/383,044

(22) Filed: Mar. 6, 2003

(65) Prior Publication Data

US 2003/0172210 A1 Sep. 11, 2003

(30) Foreign Application Priority Data

Mar. 8, 2002 (JP) ........................................ 2002-063167

(51) Int. Cl.⁷ ................................................ H04L 5/22
(52) U.S. Cl. ...................... 370/301; 370/470; 370/503; 710/104; 365/201; 326/93; 326/86; 713/400
(58) Field of Search ...................... 326/86, 93; 365/201, 365/233; 710/104, 127; 713/400; 370/301, 470, 474, 503, 529

(56) References Cited

U.S. PATENT DOCUMENTS

| | | | |
|---|---|---|---|
| 4,353,128 A | * | 10/1982 | Cummiskey ................ 370/301 |
| 5,919,254 A | * | 7/1999 | Pawlowski et al. ......... 710/104 |
| 6,052,386 A | * | 4/2000 | Achilleoudis et al. ...... 370/470 |
| 6,108,352 A | * | 8/2000 | Sferrazza et al. ........... 370/503 |
| 6,330,200 B2 | * | 12/2001 | Ooishi ........................ 365/201 |

FOREIGN PATENT DOCUMENTS

| | | |
|---|---|---|
| JP | 6-274460 | 9/1994 |
| JP | 8-335162 | 12/1996 |
| JP | 11-338821 | 12/1999 |
| JP | 2000-076180 | 3/2000 |

* cited by examiner

*Primary Examiner*—Vibol Tan
(74) *Attorney, Agent, or Firm*—Katten Muchin Zavis Rosenman

(57) ABSTRACT

An interface apparatus includes a pulse generating unit which detects the change of reading target data and generates a start pulse, an adjusting unit which generates an adjusting signal that changes from a first signal level to a second signal level in response to the start pulse, a register unit comprising a register which fetches first reading target data synchronously with a clock when the adjusting signal is at the second signal level, and holds the data and outputs the data as second reading target data when the adjusting signal is at the first signal level, and a driver unit which outputs the first reading target data synchronously with the reading signal that is asynchronous with the clock when the adjusting signal is at the second signal level, and outputs the second reading target data synchronously with the reading signal when the adjusting signal is at the first signal level.

14 Claims, 8 Drawing Sheets

INTERFACE APPARATUS

BACKGROUND OF THE INVENTION

1. Field of the Invention

The present invention relates to an interface apparatus and, more particularly, to an interface apparatus for transferring data between devices which are asynchronously operated.

2. Description of the Related Art

Conventionally, systems in which a CPU is connected to asynchronously-operated peripheral devices via a bus is well known. In the systems, a waiting cycle for a waiting operation until a synchronous timing with an operating clock (hereinbelow, referred to as an external clock) is inserted in a bus cycle of the CPU, thereby performing a control operation. It is requested that the performance due to the insertion of the waiting cycle is improved.

In order to respond to the above-mentioned request, as one related art, Japanese Unexamined Patent Application Publication No. 8-335162 discloses an "input interface circuit". In the input interface circuit, data from a peripheral device is fetched and held both at a rising edge and at a falling edge of an external clock CLK. A reading signal RS for instructing an operation to fetch the data from the peripheral device is outputted from a CPU and then the input interface circuit samples the external clock CLK by the reading signal RS from the CPU. If data as a result of sampling is at the high level (hereinafter, referred to as an H level), the data fetched and held at the rising edge is selected and is sent to the CPU. If the data as the result of sampling is at the low level (hereinafter, referred to as an L level), the data fetched and held at the falling edge is selected and is sent to the CPU.

Further, as another related art, Japanese Unexamined Patent Application Publication No. 2000-76180 discloses a bus connecting apparatus and an information processing system in which the transfer performance is improved by effectively using a buffer. Furthermore, Japanese Unexamined Patent Application Publication No. 6-274460 discloses a data communication apparatus between processors running at different speeds in which the operating efficiency of a fast processor is improved.

In addition, Japanese Unexamined Patent Application Publication No. 11-338821 discloses an asynchronous data transfer apparatus in which the overhead upon transferring data to a low-speed bus to a high-speed bus is reduced as much as possible with only a single-stage data buffer necessary for synchronization with the clock and the system performance is improved by continuously using data at the low-speed bus.

However, in the input interface circuit disclosed in Japanese Unexamined Patent Application Publication No. 8-335162, if a pulse width of the reading signal RS is 50% or more of that of the external clock CLK, dangerously, normal data is not obtained because the data from the peripheral device changes even during the reading operation of the CPU.

Further, the level of the external clock CLK is used to select any of the data fetched at the rising edge of the external clock CLK and the data fetched at the falling edge. Therefore, the design and adjustment are troublesome because they are strictly performed to always set a duty ratio of the external clock CLK constant.

SUMMARY OF THE INVENTION

The present invention is devised in consideration of the above-mentioned situation. Accordingly, it is an object of the present invention to provide an interface apparatus in which data is normally transferred between a plurality of devices which are asynchronously operated irrespective of periods of operating clocks of the devices.

In order to accomplish the foregoing object, according to a first aspect of the present invention, there is provided an interface apparatus comprising: a pulse generating unit which detects the change of reading target data and generates a start pulse; an adjusting unit which generates an adjusting signal that changes from a first signal level to a second signal level in response to the start pulse generated by the pulse generating unit; a register unit comprising a data holding register which fetches first reading target data synchronously with a clock that is externally supplied when the adjusting signal is at the second signal level, and holds the data and outputs the data as second reading target data when the adjusting signal is at the first signal level; and a driver unit which outputs the first reading target data synchronously with a reading signal that is asynchronous with the clock when the adjusting signal is at the second signal level, and outputs the second reading target data synchronously with the reading signal when the adjusting signal is at the first signal level.

Further, according to a second aspect of the present invention, there is provided an interface apparatus set between a peripheral device and a bus, comprising: an adjusting unit which generates an adjusting signal that changes from a first signal level to a second signal level in response to a start pulse inputted from the peripheral device; a register unit comprising a data holding register which fetches first reading target data synchronously with a clock that is supplied from the peripheral device when the adjusting signal is at the second signal level, and holds and outputs the data as second reading target data when the adjusting signal is at the first signal level; and a driver unit which outputs the first reading target data synchronously with a reading signal that is externally supplied asynchronously with the clock when the adjusting signal is at the second signal level, and outputs the second reading target data synchronously with the reading signal when the adjusting signal is at the first signal level.

The above and other objects and features of the present invention will become apparent from the following detailed description and the appended claims with reference to the accompanying drawings.

BRIEF DESCRIPTION OF THE DRAWINGS

The attached drawings of the present invention are briefly described so as to be clearly understood.

DESCRIPTION OF THE PREFERRED EMBODIMENTS

Hereinbelow, a detailed description is given of preferred embodiments of the present invention with reference to the attached drawings. The following describes the embodiments of the present invention and the present invention is not limited to this.

Figure 1:
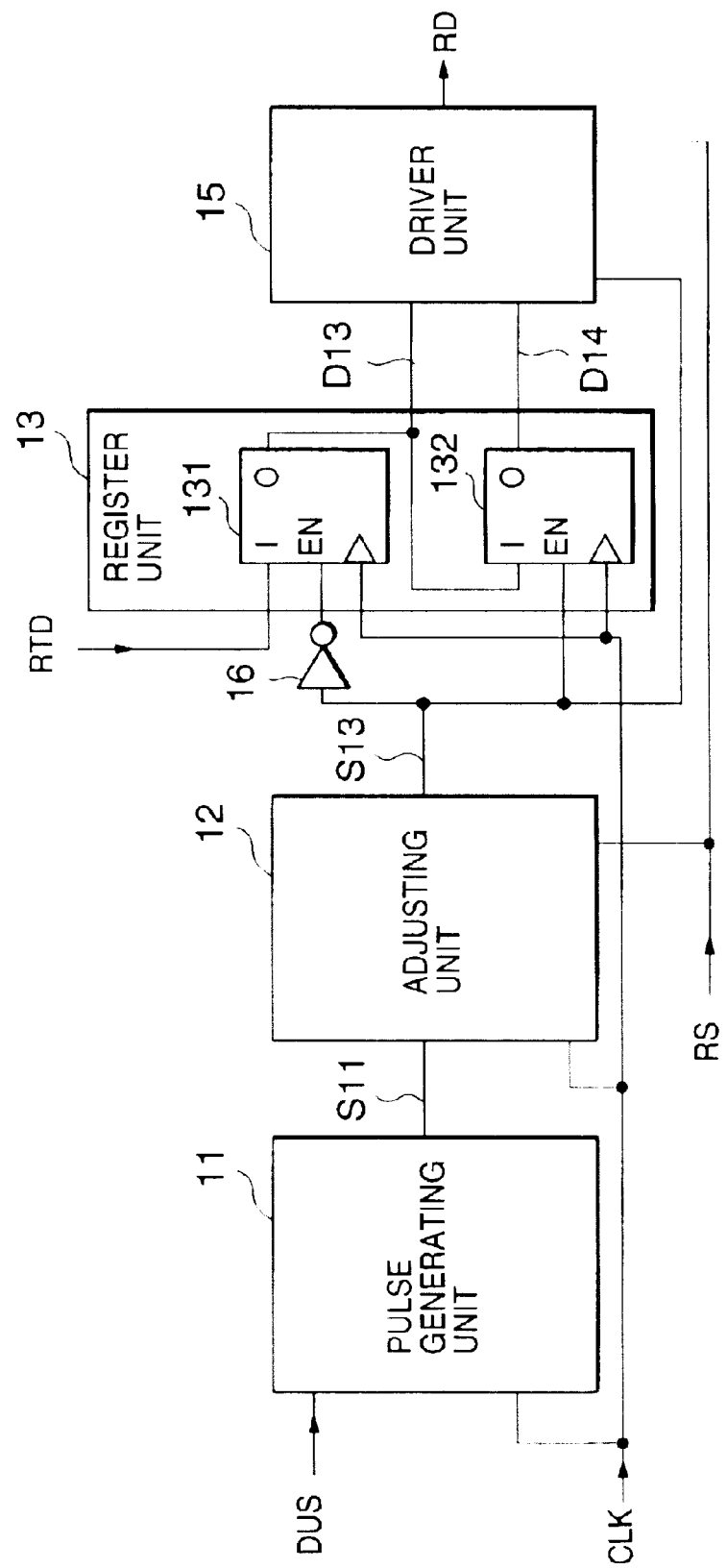
FIG. 1 is a block diagram showing the structure of an interface apparatus according to a first embodiment of the present invention.

FIG. 1 is a block diagram showing the structure of an interface apparatus according to a first embodiment of the present invention. An interface apparatus according to the first embodiment comprises a pulse generating unit 11, an adjusting unit 12, a register unit 13, a driver unit 15, and an inverter 16.

The pulse generating unit 11 receives a reading target data updating signal DUS which changes upon updating reading target data RTD and then generates a start pulse S11.

The adjusting unit 12 generates an adjusting signal S13 which changes from a first signal (L level) to a second signal level (H level) in response to the start pulse S11 which is generated by the pulse generating unit 11.

The register unit 13 comprises: a data writing register 131 which fetches reading target data RTD that is externally supplied when the adjusting signal S13 is at the first signal level, synchronously with an external clock CLK and which holds data D13 and outputs data D13 as first reading target data when the adjusting signal S13 is at the second signal level; and a data holding register 132 which fetches the data D13 into the external clock CLK when the adjusting signal S13 is at the second signal level, holds the data when the adjusting signal S13 is at the first signal level, and outputs data D14 as second reading target data.

The driver unit 15 outputs the data D13 synchronously with a reading signal RS externally supplied asynchronously with the external clock CLK when the adjusting signal S13 is at the second signal level, and further outputs the data D14 synchronously with the reading signal RS when the adjusting signal S13 is at the first signal level.

The inverter 16 receives the adjusting signal S13, generates an inverse signal thereof, and supplies the data to the register unit 13.

In the interface apparatus according to the first embodiment, the reading target data RTD sent from a peripheral device (not shown) is updated at a timing of falling change of the reading target data updating signal DUS transmitted from the peripheral device. Hereinbelow, a description is given of the case in which a CPU (not shown) fetches the reading target data RTD from the peripheral device as reading data RD via a bus (not shown) which connects the interface apparatus and the CPU.

Figure 2:
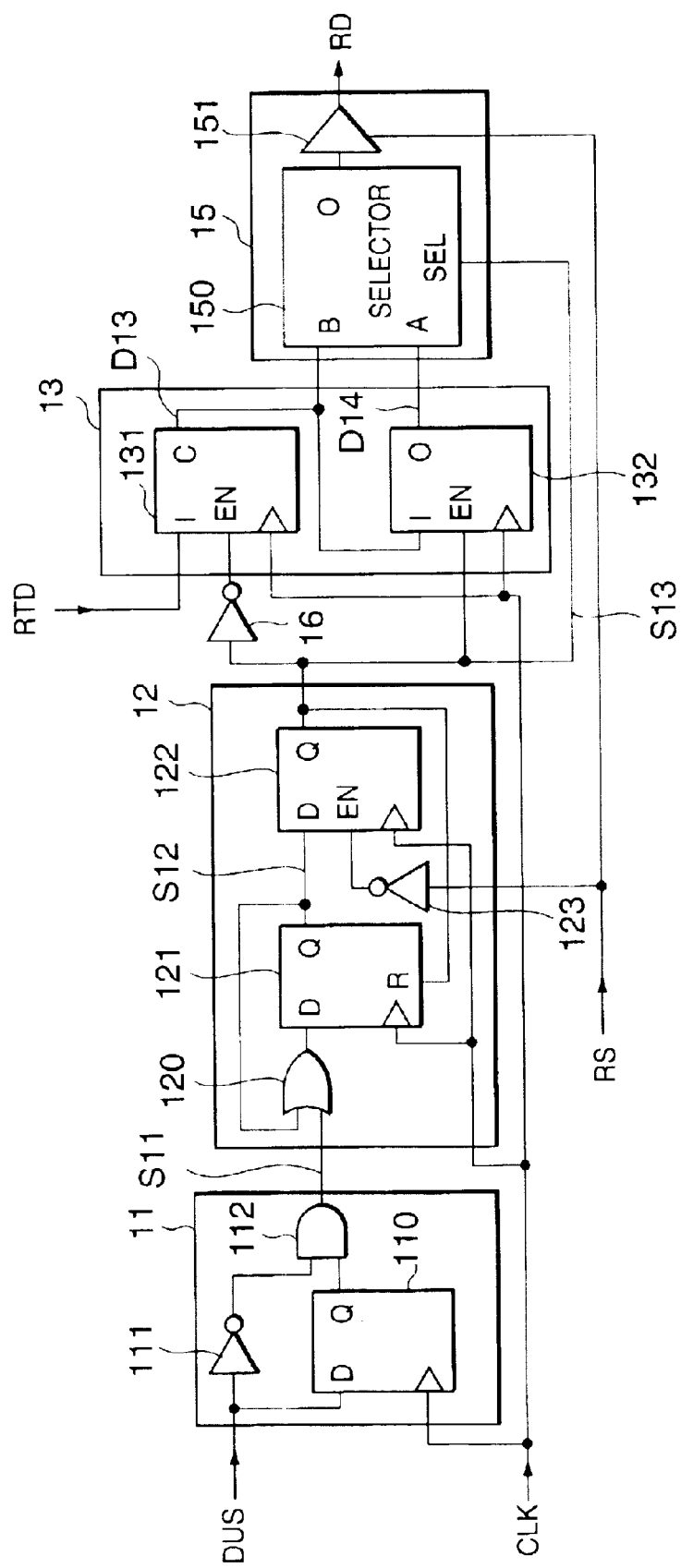
FIG. 2 is a circuit diagram of the interface apparatus according to the first embodiment.

FIG. 2 is a circuit diagram showing the structure of the interface apparatus according to the first embodiment of the present invention. Hereinbelow, a detailed description is given of the structure of blocks shown in FIG. 1 with reference to FIG. 2.

The pulse generating unit 11 comprises a so-called digital differentiating circuit which detects the falling change of the reading target data updating signal DUS and which generates the start pulse S11 that becomes the H level only for a single period of the external clock CLK. The external clock CLK and the reading target data updating signal DUS are supplied to the pulse generating unit 11 from the peripheral device (not shown). The external clock CLK is the same as an operating clock used by the peripheral device. The reading target data updating changing signal DUS changes synchronously with the external clock CLK. The falling change of the reading target data updating signal DUS indicates the change of the reading target data RTD.

Specifically, the pulse generating unit 11 comprises a D flip-flop 110, an inverter 111, and an AND gate 112.

The external clock CLK is supplied to a clock input terminal of the D flip-flop 110, and the reading target data updating signal DUS is supplied to a data input terminal D. Further, the reading target updating signal DUS is supplied to one input terminal of the AND gate 112 via the inverter 111. A signal from an output terminal Q of the D flip-flop 110 is supplied to another input terminal of the AND gate 112.

The reading target data updating signal DUS keeps the H level until the reading target data RTD is updated. Therefore, the H-level signal is outputted from the output terminal Q of the D flip-flop 110 until the reading target updating signal DUS is updated. In this status, the reading target data updating signal DUS changes from the H level to the L level synchronously with the rising change of the external clock CLK and then an output signal from the AND gate 112 changes from the L level to the H level.

The D flip-flop 110 always samples the reading target data updating signal DUS by the external clock CLK. Consequently, a signal from the output terminal Q of the D flip-flop 110 changes to the L level by the rising change of the first external clock CLK after the reading target data updating signal DUS changes from the H level to the L level. By the above-mentioned operations, the AND gate 112 outputs the start pulse S11 at the H level for a period from the H level to the L level change of the reading target data updating signal DUS to the rising change of the next external clock CLK. The start pulse S11 generated by the pulse generating unit 11 is sent to the adjusting unit 12.

The adjusting unit 12 outputs an adjusting signal S13 which permits to write data to the data holding register 132 in response to the start pulse S11 from the pulse generating unit 11, initializes itself, and waits until fetching the next start pulse S11. The adjusting unit 12 maintains the adjusting signal S13 while the reading signal RS sent from the CPU (not shown) is active (at the H level), namely, during a reading period.

The start pulse S11 is supplied to the adjusting unit 12 from the pulse generating unit 11, and the external clock CLK is supplied to the adjusting unit 12 from the peripheral device (not shown), and the reading signal RS is supplied from the CPU (not shown). The CPU supplies the reading signal RS asynchronously with the external clock CLK and requests an operation for fetching the reading target data RTD. The interface apparatus outputs the reading target data RTD while the reading signal RS is active (at the H level). More strictly, the interface apparatus responds to the reading signal RS and outputs the reading target data RTD which is held in the register unit 13 or 14. Thus, the reading target data RTD which changes asynchronously becomes synchronous with the reading signal RS.

Specifically, the adjusting unit 12 comprises an OR gate 120, a D flip-flop 121, a D flip-flop 122 with an enable input terminal EN, and an inverter 123.

The start pulse S11 from the pulse generating unit 11 is inputted to one input terminal of the OR gate 120. A signal S12 from an output terminal Q of the D flip-flop 121 is inputted to another input terminal of the OR gate 120. The OR gate 120 forms logical OR of the start pulse S11 and the signal S12 and supplies the logical OR to a data input terminal D of the D flip-flop 121.

The D flip-flop 121 fetches and stores a signal supplied to a data input terminal D from the OR gate 120 synchronously with the rising change of the external clock CLK. The signal S12 outputted from the output terminal Q of the D flip-flop 121 is supplied to the other input terminal of the OR gate 120 as mentioned above. Consequently, if the D flip-flop 121 is set once by the start pulse S11, it is continuously set until the adjusting signal S13 as a reset signal is supplied to a reset input terminal R. Further, the signal S12 outputted from an output terminal Q of the D flip-flop 122 is supplied to a data input terminal D of the D flip-flop 122.

Only when a signal supplied to the enable input terminal EN is at the H level, the D flip-flop 122 fetches and stores the signal S12 supplied to the data input terminal D from the output terminal Q of the D flip-flop 121 synchronously with the rising change of the external clock CLK. The reading signal RS is inverted by the inverter 123 and is supplied to the enable input terminal EN of the D flip-flop 122. Therefore, when the reading signal RS is not active (at the H level), namely, only for a period except for the reading one, the D flip-flop 122 fetches and stores the signal S12.

The adjusting signal S13 outputted from the output terminal Q of the D flip-flop 122 is supplied to the reset input terminal R of the D flip-flop 121 and is supplied to an input terminal of the inverter 16 and the enable input terminal EN of the data holding register 132. The signal outputted from the inverter 16 is supplied to the enable input terminal EN of the data writing register 131.

In the adjusting unit 12 with the above structure, if the reading signal RS is not active (at the H level) at the end timing of the external clock period next to the start pulse S11, the H-level signal is supplied to the enable input terminal EN of the D flip-flop 122. Thus, the start pulse S11 is transmitted through the D flip-flops 121 and 122 and is sequentially shifted. The adjusting unit 12 outputs the adjusting signal S13 which is at the H level only for one period of the external clock CLK after two periods thereof.

On the other hand, if the reading signal RS is active (at the H level) at the end timing of the period of the external clock CLK next to the start pulse S11, the L-level signal is supplied to the enable input terminal EN of the D flip-flop 122. Although the D flip-flop 121 is set at the H level by the start pulse S11, the D flip-flop 122 is not shifted. Therefore, the adjusting signal S13 keeps the H level even after the two periods of the external clock CLK.

According to the first embodiment, the register unit 13 comprises a data writing register 131 and a data holding register 132.

The data writing register 131 comprises a plurality of D flip-flops with an enable input terminal EN, which store data consisting of a plurality of bits. The external clock CLK is transmitted to a clock input terminal of the data writing register 131, the reading target data RTD which is externally sent is transmitted to a data input terminal I, and a signal obtained by inverting the adjusting signal S13 by the inverter 16 from the adjusting unit 12 is supplied to the enable input terminal EN. As a result, only when the adjusting signal S13 from the adjusting unit 12 is at the L level as the first signal level, namely, only for a period except for the reading one, the data writing register 131 fetches and stores the reading target data RTD which is externally supplied. The data D13 stored in the data writing register 131 as first reading target data is supplied to the data holding register 132 and the driver unit 15 from a data output terminal O.

The data holding register 132 comprises a plurality of D flip-flops with an enable input terminal EN, which store data consisting of a plurality of bits. The external clock CLK is transmitted to a clock input terminal of the data holding register 132, the data D13 is transmitted from the data writing register 131 to a data input terminal I, and the adjusting signal S13 from the adjusting unit 12 is transmitted to the enable input terminal EN. As a result, only when the adjusting signal S13 from the adjusting unit 12 is at the H level, namely, only for the reading period, the data holding register 132 fetches and stores the data D13 which is supplied from the data writing register 131. The data D14 stored in the data holding register 132 as the second reading target data is supplied to the driver unit 15 from a data output terminal O.

The driver unit 15 comprises a selector 150 and a buffer 151. The data D14 from the data holding register 132 is supplied to an input terminal A of the selector 150 and the data D13 from the data writing register 131 is supplied to an input terminal B of the selector 150. The adjusting signal S13 from the adjusting unit 12 is transmitted to a selecting terminal SEL of the selector 150. Therefore, if the adjusting signal S13 is at the L level as the first signal level, the selector 150 selects the data D14 stored in the data holding register 132. If the adjusting signal S13 is at the H level as the second signal level, the selector 150 selects the data D13 stored in the data writing register 131 and supplies it to the buffer 151.

The buffer 151 outputs the signal from the selector 150 if the reading signal RS is at the H level, and it stops an output operation if the reading signal RS is at the L level. Therefore, the data D13 or the data D14 is outputted as the reading data RD only while the reading signal RS is at the H level.

Figure 3:
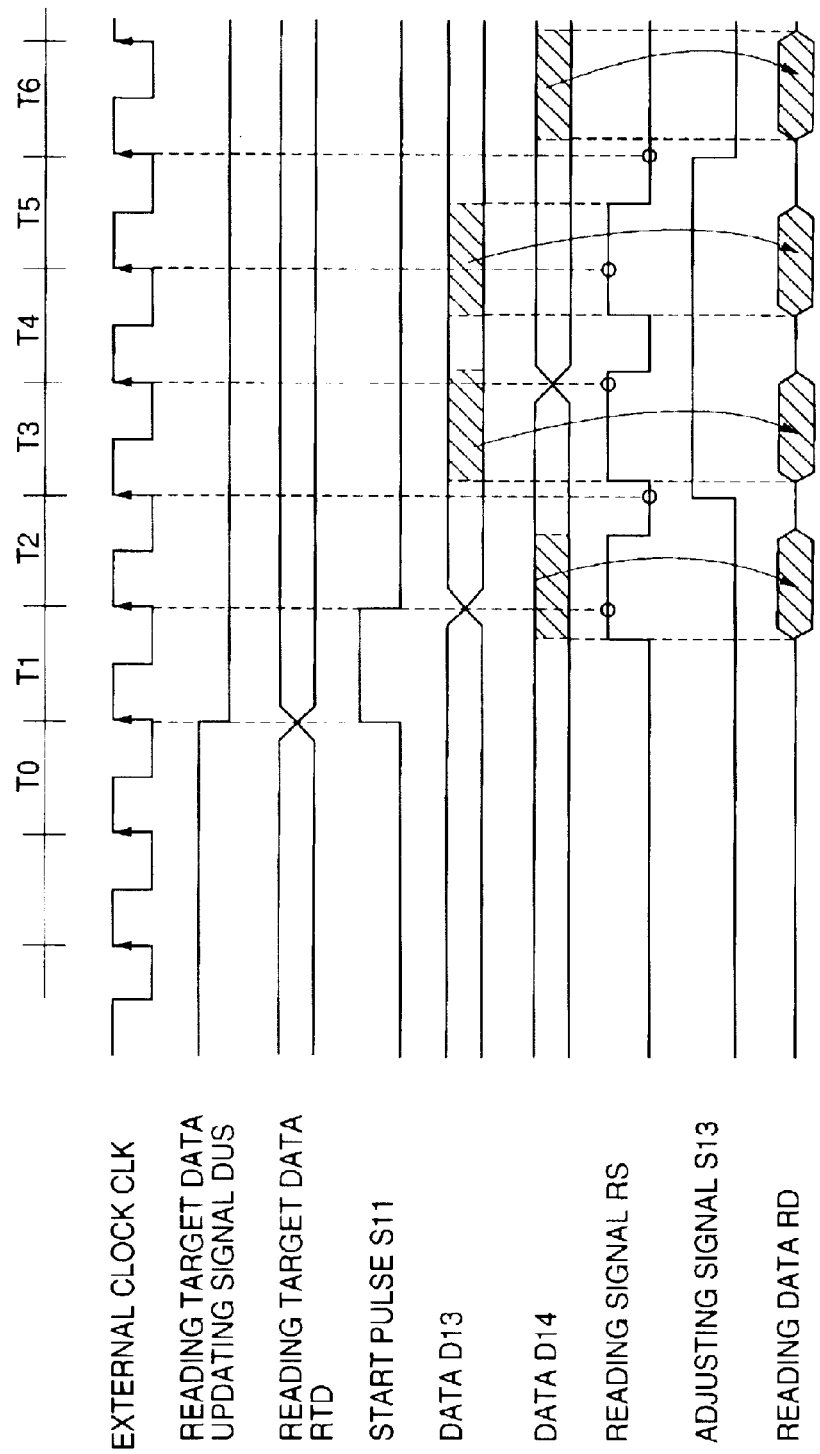
FIG. 3 is a timing chart for explaining an operation of the interface apparatus according to the first embodiment.

Next, a description is given of the operation of the interface apparatus with the above-mentioned structure with reference to a timing chart shown in FIG. 3.

The external clock CLK as shown in FIG. 3 is supplied to the interface apparatus from the peripheral device. The peripheral device changes the reading target data updating signal DUS from the H level to the L level at the end timing of an external clock period T0 and outputs the updated reading target data RTD.

The pulse generating unit 11 receives the reading target data updating signal DUS which changes from the H level to the L level at the head timing of an external clock period T1, generates and transmits the start pulse S11 which is at the H level only for the external clock period T1, and it to the adjusting unit 12. Since the adjusting signal S13 is still at the L level for the external clock period T1, the reading target data RTD updated at the head timing of the external clock period T1 is fetched and stored in the data writing register 131 at the head timing of an external clock period T2.

Referring to FIG. 3, if the reading signal RS outputted from the CPU changes to the H level for the external clock period T1, the adjusting signal S13 is still at the L level for the external clock period T1. Therefore, the selector 150 selects and sends the data D14 outputted from the data holding register 132 to the buffer 151. The buffer 151 transmits the signal from the selector 150 as the reading data RD to the CPU via the bus only when the reading signal RS is at the H level.

If the data D13 from the data writing register 131 is transmitted to the CPU as the reading data RD, the data which changes during the reading operation is sent to the CPU. Thus, the CPU does not fetch normal data. However, in the interface apparatus according to the first embodiment, the data D14 from the data holding register 132 which is stably operated is transmitted to the CPU via the bus as the reading data RD and the CPU fetches the normal data.

The adjusting unit 12 which receives the start pulse S11 sets the D flip-flop 121 at the head timing of the external clock period T2. The reading signal RS is at the L level at the end timing of the external clock period T2 and therefore the D flip-flop 122 is set at the head timing of an external clock period T3. As a result, the adjusting signal S13 changes from the L level to the H level at the head timing of the external clock timing T3. By supplying the adjusting signal S13 to the reset input terminal R of the D flip-flop 121, the D flip-flop 121 is reset and shifts to a status in which the next start pulse S11 can be received.

Further, by changing the adjusting signal S13 from the L level to the H level, the writing operation to the data writing register 131 is prohibited and the writing operation to the data holding register 132 is permitted. As shown in FIG. 3, the data D13 outputted from the data writing register 131 at the head timing of an external clock period T4 is set to the data holding register 132.

If the reading signal RS outputted from the CPU changes to the H level for the external clock period T3 as shown in FIG. 3, the adjusting signal S13 is at the H level for the external clock period T3. Consequently, the writing operation to the data writing register 131 is prohibited and the selector 150 selects and sends the data D13 outputted from the data writing register 131 to the buffer 151. The buffer 151 transmits the signal from the selector 150 as the reading data RD to the CPU only when the reading signal RS is at the H level.

Since contents of the data writing register 131 are not changed during the reading operation by the above-mentioned operation, the CPU fetches the normal data.

The same operations are sequentially performed. In the example shown in FIG. 3, since the reading signal RS is at the H level at the end timings of the external clock period T3 and the external clock period T4, the D flip-flop 122 holds the status. Consequently, a timing at which the adjusting signal S13 changes to the L level is delayed by two external clocks. When the adjusting signal S13 is at the L level, the writing operation to the data writing register 131 is permitted. When the adjusting signal S13 is at the H level, the writing operation to the data holding register 132 is permitted. The driver unit 15 sets the data D14 to the reading data RD when the adjusting signal S13 is at the L level. It sets the data D13 to the reading data RD when the adjusting signal S13 is at the H level. As a result, the stable data is always selected.

As mentioned above, according to the first embodiment, a bus cycle of the CPU needs no waiting cycle irrespective of an asynchronous relationship between the bus cycle and the external clock CLK by controlling the timing for writing the reading target data to the two registers of the data writing register 131 and the data holding register 132 and by controlling the operation for obtaining the data sent to the CPU from the stable register. Further, the stable data is accurately transmitted to the CPU irrespective of the period of the bus cycle and the period of the external clock CLK.

Even if the frequency of the external clock CLK changes by the system, the interface apparatus according to the first embodiment is stably operated. Further, advantageously, the design is easy because the single portion of the adjusting unit 12 is asynchronously operated.

According to the first embodiment, the register comprising the plurality of D flip-flops is used as the data writing register 131 and the data holding register 132. However, storing devices such as a level latch and a RAM can be used.

A circuit for transmitting the reading target data RTD and the timing for updating the data functions as a part of the function of the interface apparatus depending on the peripheral device. The interface apparatus used for the peripheral device is simply structured.

According to a second embodiment of the present invention, the basic structure is the same as that according to the first embodiment. However, there is provided an interface apparatus according to the second embodiment preferable to a peripheral device, in which a register includes a circuit for transmitting the data D23 as the first reading target data is provided in the peripheral device and a cycle for updating the data is longer than a reading cycle of the CPU.

Figure 4:
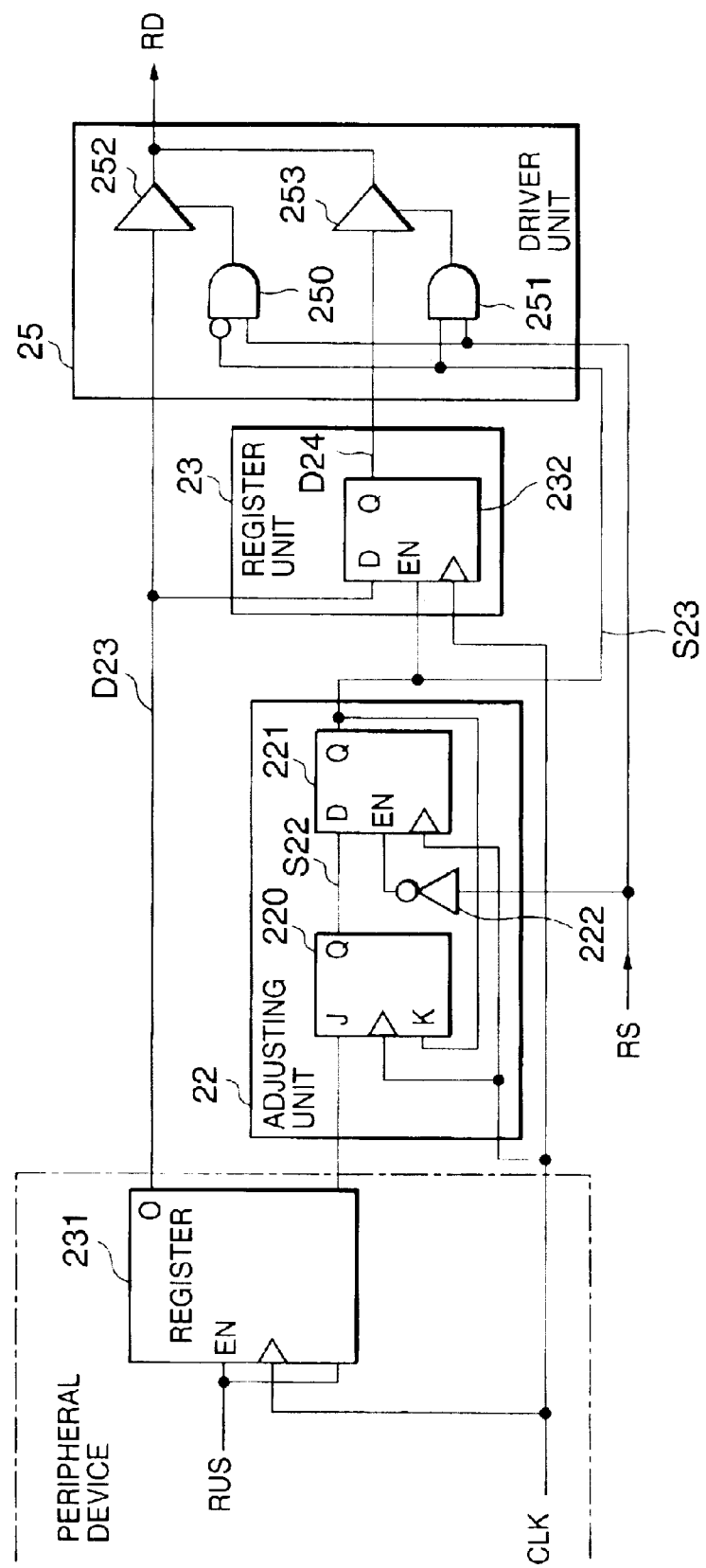
FIG. 4 is a circuit diagram showing the structure of an interface apparatus according to a second embodiment of the present invention.
Figure 5:
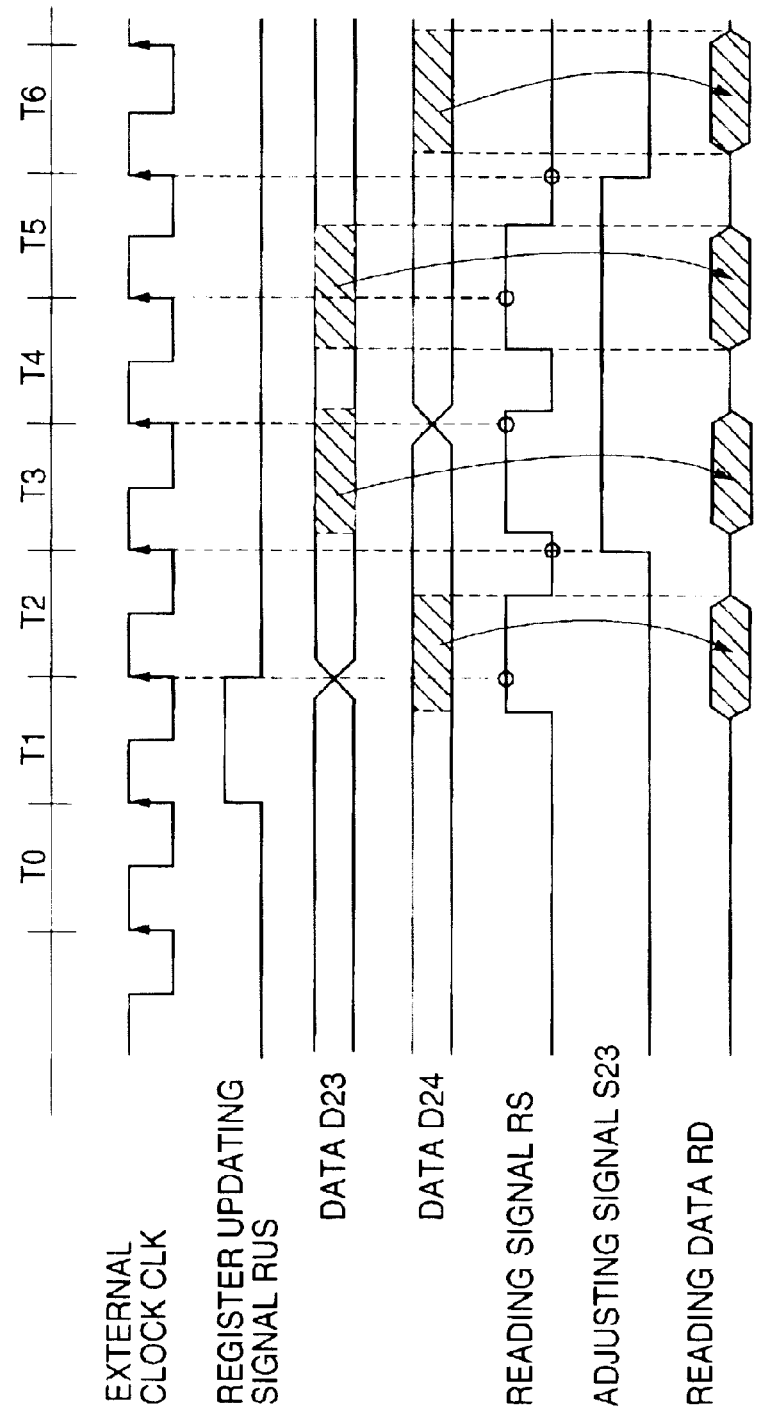
FIG. 5 is a timing chart for explaining an operation of the interface apparatus according to the second embodiment.

FIG. 4 is a circuit diagram showing the structure of the interface apparatus according to the second embodiment of the present invention. Referring to FIG. 4, a data writing register 231 is provided for the peripheral device, corresponding to the data writing register 131 according to the first embodiment. Referring to FIG. 5, a register updating signal RUS consisting of one shot pulse having the H level only for the single period of the external clock CLK is supplied to an enable input terminal EN of the data writing register 231. Thus, referring to FIG. 5, the data D23 inputted to the interface apparatus from the peripheral device according to the second embodiment is updated synchronously with the falling change of the register updating signal RUS.

The interface apparatus comprises an adjusting unit 22, a register unit 23, and a driver unit 25.

The adjusting unit 22 outputs an adjusting signal S23 which permits the writing operation to a data holding register 232 in response to the register updating signal RUS from the peripheral device, initializes itself, and waits until fetching the next register updating signal RUS. The adjusting unit 22 holds a status of the adjusting signal S23 while the reading signal RS sent from a CPU (not shown) is active (at the H level), namely, during the reading operation.

To the adjusting unit 22, the register updating signal RUS and the external clock CLK are supplied from the peripheral device and the reading signal RS is supplied from the CPU (not shown). Specifically, the adjusting unit 22 comprises a JK flip-flop 220, a D flip-flop 221 with an enable input terminal EN, and an inverter 222.

The external clock CLK is inputted to a clock input terminal of the JK flip-flop 220 and the register updating signal RUS is inputted to an input terminal J. Further, the adjusting signal S23 outputted from an output terminal Q of the D flip-flop 221 is inputted to an input terminal K. The JK flip-flop 220 is set at the end timing of the external clock period at which the register updating signal RUS supplied to the input terminal J changes to the H level, and is reset at the end timing of the external clock period at which the adjusting signal S23 changes to the L level.

Thus, when the JK flip-flop 220 is set once by the register updating signal RUS, it maintains the setting status until supplying the adjusting signal S23 at the H level to the input terminal K. A signal S22 outputted from an output terminal Q of the JK flip-flop 220 is supplied to a data input terminal D of the D flip-flop 221.

The D flip-flop 221 fetches and stores a signal S22 supplied to a data input terminal D from an output terminal Q of the D flip-flop 220 synchronously with the rising change of the external clock CLK only when the signal supplied to the enable input terminal EN is at the H level.

The reading signal RS is inverted by the inverter 222 and is supplied to the enable input terminal EN of the D flip-flop 221. Therefore, when the reading signal RS is not active (at the H level), namely, only during a period except for the reading operation, the D flip-flop 221 fetches and stores the signal S22.

The adjusting signal S23 outputted from the output terminal Q of the D flip-flop 221 is supplied to an input terminal K of the JK flip-flop 220 and is supplied to an enable input terminal EN of the data holding register 232.

If the reading signal RS is not active (at the H level) at the end of the external clock period next to the register updating signal RUS, the signal at the H level is supplied to the enable input terminal EN of the D flip-flop 221 in the adjusting unit 22 with the above structure. Thus, the register updating signal RUS sequentially shifts to the JK flip-flop 220 and the D flip-flop 221, and the adjusting unit 22 outputs the adjusting signal S23 which is at the H level only for the single external clock period after two external clock periods.

If the reading signal RS is active (at the H level) at the end of the external clock period next to the register updating signal RUS, the signal at the L level is supplied to the enable input terminal EN of the D flip-flop 221. Thus, the JK flip-flop 220 is set at the H level by the register updating signal RUS and, however, the register updating signal RUS is not shifted to the D flip-flop 221. Therefore, the adjusting signal S23 maintains H level even after the two external clock periods.

According to the second embodiment, the register unit 23 comprises the data holding register 232. The data holding register 232 comprises a plurality of D flip-flops with the enable input terminal EN, which can store data consisting of a plurality of bits. The external clock CLK is supplied to the clock input terminal of the data holding register 232 and the data D23 corresponding to the data D13 according to the first embodiment is supplied to the data input terminal D as the first reading target data. Further, the adjusting signal S23 from the adjusting unit 22 is supplied to the enable input terminal EN. Only when the adjusting signal S23 from the adjusting unit 22 is at the H level, namely, during only the reading operation, the data D23 supplied from the data writing register 231 is fetched and stored. The data D24 stored in the data holding register 232 is supplied to the driver unit 25 as the second reading target data.

The driver unit 25 has the same function as that of the driver unit 15 according to the first embodiment. The driver unit 25 comprises a gate circuit 250, an AND gate 251, a 3-state buffer 252, and a 3-state butter 253. The data D23 is supplied to the 3-state buffer 252 in the driver unit 25 from the data writing register 231, and the reading target data S23 is supplied to the 3-state buffer 253 from the second register 23.

The adjusting signal S23 from the adjusting unit 22 is supplied to an inverse input terminal of the gate circuit 250 and the reading signal RS is supplied to a non-inverse input terminal. When the adjusting signal S23 is at the L level and the reading signal RS is at the H level, the active (H level) signal is supplied to an output enable terminal of the 3-state buffer 252. Thus, the data D23 from the data writing register 231 is sent to the CPU as the reading data RD.

The adjusting signal S23 from the adjusting unit 22 is supplied to one input terminal of the AND gate 251 and the reading signal RS is supplied to another input terminal. When the adjusting signal S23 and the reading signal RS are at the H level, the active (H level) signal is supplied to an output enable terminal of the 3-state buffer 253. Consequently, the data D24 from the data holding register 232 is sent to the CPU as the reading data RD.

When the reading signal RS is active, the driver unit 25 selectively outputs any of the data D23 and the data D24 in response to the adjusting signal S23.

Next, a description is given of the operation of the interface apparatus with the above-mentioned structure with reference to a timing chart shown in FIG. 5. Incidentally, the operation of the interface apparatus according to the second embodiment is the same as that of the interface apparatus according to the first embodiment, excluding the case in which the register updating signal RUS sent from the peripheral device is used in place of the start pulse generated by the pulse generating unit 11 according to the first embodiment. A brief description is given hereinbelow.

Referring to FIG. 5, the data writing register 231 for holding the reading target data of the peripheral device is updated by the register updating signal RUS as one shot pulse signal synchronous with the external clock CLK. The register updating signal RUS is fetched to the adjusting unit 22, thereby changing the adjusting signal S23 for controlling the writing operation to the data holding register 232 to the H level. The adjusting unit 22 initializes itself after the adjusting signal S23 is changed to the H level and the D flip-flop 221 holds a previous state during the reading operation. Consequently, a timing for changing to the L level is delayed by two external clocks.

The driver unit 25 transmits the data D24 as the reading data RD when the adjusting signal S23 is at the L level as the first signal level and it transmits the data D23 as the reading data RD when it is at the H level as the second signal level. When the data D23 is selected and then the reading signal RS is active, the data writing register 231 is not updated since the cycle for updating the data is longer than the reading cycle. Thus, stable data is accurately sent to the CPU.

In the interface apparatus according to the second embodiment, the pulse generating unit is unnecessary and the single register for holding the reading target data is provided. As compared with the interface apparatus according to the first embodiment, the structure of the interface apparatus is simple according to the second embodiment. As a result, the design is simplified and the interface apparatus is inexpensive.

The adjusting unit 22 according to the second embodiment has substantially the same function as that of the adjusting unit 12 according to the first embodiment. In place of the adjusting unit 22 shown in FIG. 4 according to the second embodiment, the adjusting unit 12 shown in FIG. 2 may be used. On the contrary, in place of the adjusting unit 12 shown in FIG. 2 according to the first embodiment, the adjusting unit 22 shown in FIG. 4 may be used.

The driver unit 25 according to the second embodiment has substantially the same function as that of the driver unit 15 shown in FIG. 2 according to the first embodiment. In place of the driver unit 25 shown in FIG. 4 according to the second embodiment, the driver unit 15 shown in FIG. 2 according to the first embodiment may be used. On the contrary, in place of the driver unit 15 shown in FIG. 2 according to the first embodiment, the driver unit 25 shown in FIG. 4 may be used.

According to a third embodiment, an interface apparatus is preferable to the case of using a communication device for data communication as a peripheral device. The interface apparatus uses such characteristics of the communication device that reception data is updated to new data from old data and a reception completing flag is set.

The interface apparatus according to the third embodiment has the same basic structure as that according to the second embodiment. However, according to the second embodiment, the data writing register 231 on the peripheral device side is included.

Figure 6:
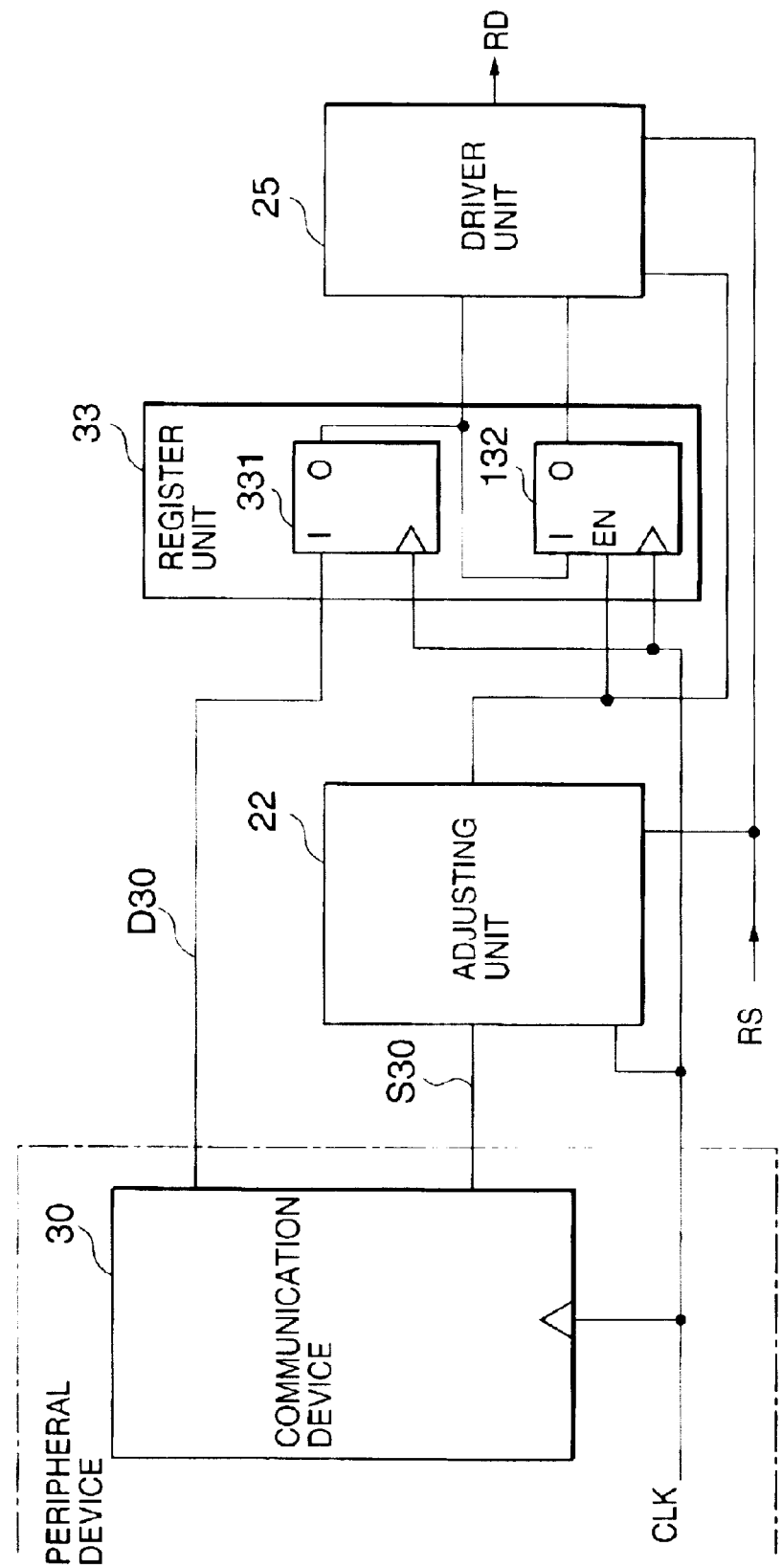
FIG. 6 is a block diagram showing the structure of an interface apparatus according to a third embodiment of the present invention.

FIG. 6 is a block diagram showing the structure of the interface apparatus according to the third embodiment of the present invention. The interface apparatus comprises the adjusting unit 22, a register unit 33, and the driver unit 25.

According to the third embodiment, the register unit 33 comprises a data writing register 331 and the data holding register 132. Since the data writing register 331 does not include the enable input terminal, data is fetched every external clock CLK. However, an output from the data holding register 132 is selected when data from the data writing register 331 can be changed in both the driver unit 15 according to the first embodiment and the driver unit 25 according to the second embodiment. If the above-mentioned driver units are used, any of the data writing register 132 (and the inverter 16) according to the first embodiment and the data writing register 331 according to the third embodiment may be used as the data writing register. Hereinbelow, the same reference numerals as those according to the second embodiment denote the same components and a description thereof is omitted.

Reception data D30 outputted from a communication device 30 is read. In the communication device 30, a reception completing flag S30 indicates that the data is updated and has the same characteristics as those of the register updating signal RUS according to the second embodiment. Therefore, the reception completing flag S30 is supplied to the adjusting unit 22. According to the third embodiment, the operation of the interface apparatus is the same as that according to the second embodiment.

The interface apparatus according to the third embodiment does not need the pulse generating unit, similarly to the second embodiment. Thus, the structure of the interface apparatus is simple.

Referring to FIG. 6, the adjusting unit 22 is used similarly to that shown in FIG. 4 according to the second embodiment. However, in place of the adjusting unit 22, the adjusting unit 12 shown in FIG. 2 may be used. The driver unit 25 similar to that shown in FIG. 4 according to the second embodiment is used. However, in place of the driver unit 25, the driver unit 15 shown in FIG. 2 may be used.

An interface apparatus according to a fourth embodiment of the present invention is preferable to the case of using an ADC device for A/D conversion as the peripheral device. The interface apparatus advantageously uses characteristics of the ADC device in which an AD conversion end flag is generated as soon as the AD conversion is completed.

Figure 7:
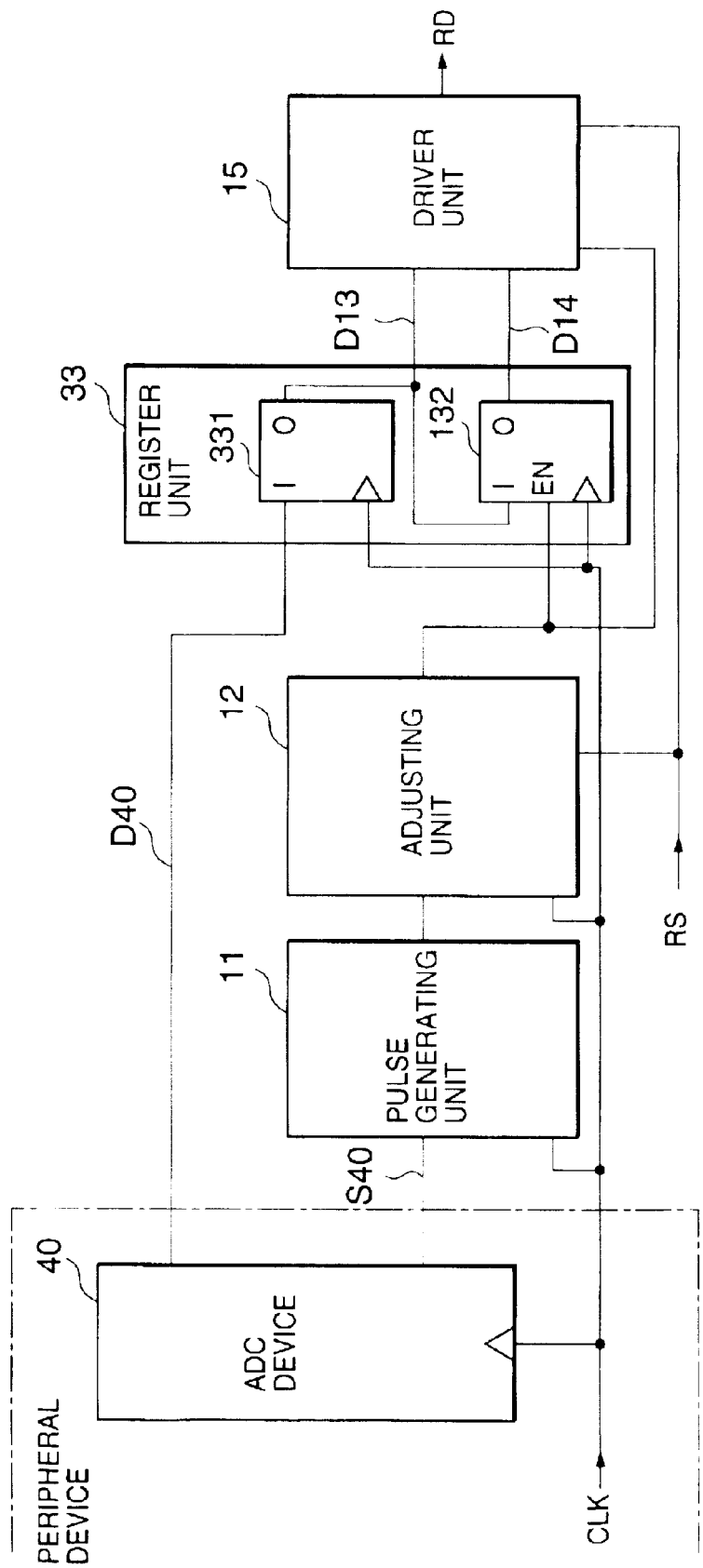
FIG. 7 is a block diagram showing the structure of an interface apparatus according to a fourth embodiment of the present invention.

FIG. 7 is a block diagram showing the structure of the interface apparatus according to the fourth embodiment of the present invention. The interface apparatus comprises the pulse generating unit 11, the adjusting unit 12, the register unit 33, and the driver unit 15.

According to the fourth embodiment, the register unit 33 comprises the data writing register 331 and the data holding register 132. Hereinbelow, the same reference numeral as that according to the first embodiment denotes the same portion or corresponding portion and a description thereof is omitted.

Digital data D40 outputted from an ADC device 40 is read. In the ADC device, the AD conversion end flag indicates the completion of the AD conversion, and has the same characteristics as those of the reading target data updating signal DUS according to the first embodiment. Therefore, the AD conversion end flag S40 is supplied to the pulse generating unit 11. The operation of the interface apparatus according to the fourth embodiment is the same as that according to the first embodiment.

The interface apparatus according to the fourth embodiment has the operation and advantages similar to those according to the first embodiment.

Referring to FIG. 7, according to the fourth embodiment, the adjusting unit 12 is used similarly to FIG. 2 according to the first embodiment. In place of the adjusting unit 12, the adjusting unit 22 shown in FIG. 4 may be used. Although the driver unit 15 is used as shown in FIG. 7 similarly to that shown in FIG. 2 according to the first embodiment, the driver unit 25 shown in FIG. 4 may be used in place of the driver unit 15.

An interface apparatus according to a fifth embodiment of the present invention is preferable to the case of using a timer device as the peripheral device. The interface apparatus advantageously uses characteristics of the timer device in which a timer value is updated synchronously with a count-up flag CF having one shot pulse.

According to the fifth embodiment, the basic structure of the interface apparatus is the same as that according to the second embodiment. The interface apparatus according to the fifth embodiment uses the count-up flag CF as the start pulse.

Figure 8:
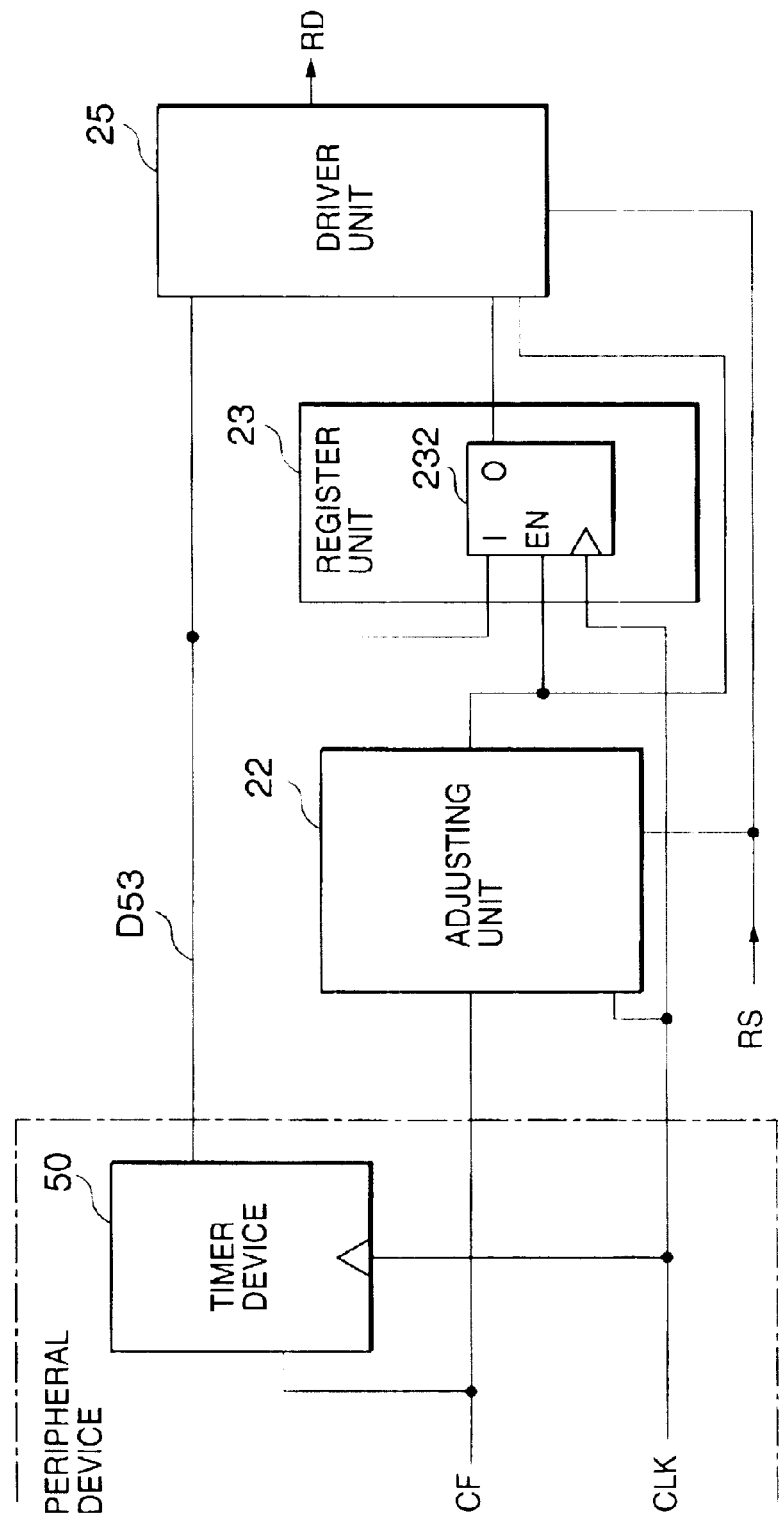
FIG. 8 is a block diagram showing the structure of an interface apparatus according to a fifth embodiment of the present invention.

FIG. 8 is a block diagram showing the structure of the interface apparatus according to the fifth embodiment of the present invention. The interface apparatus comprises the adjusting unit 22, the register unit 23, and the driver unit 25.

According to the fifth embodiment, the register unit 23 comprises the data writing register 232. Hereinbelow, the same reference numeral as that according to the second embodiment denotes the same portion or corresponding portion and a description thereof is omitted.

A timer value D53 outputted from a timer device 50 is read. In the timer device, the count-up flag CF indicates that it changes simultaneously with the operation for updating the timer value, and has the same characteristics as those of the register updating signal RUS according to the second embodiment. Therefore, the count-up flag CF is supplied to the adjusting unit 22 as the start pulse. The operation of the interface apparatus according to the fifth embodiment is the same as that according to the second embodiment.

The interface apparatus according to the fifth embodiment has the operation and advantages similar to those according to the second embodiment.

Referring to FIG. 8, according to the fifth embodiment, the adjusting unit 22 is used similarly to FIG. 4 according to the second embodiment. In place of the adjusting unit 22, the adjusting unit 12 shown in FIG. 2 may be used. Although the driver unit 25 is used as shown in FIG. 8 similarly to that shown in FIG. 4 according to the second embodiment, the driver unit 15 shown in FIG. 2 may be used in place of the driver unit 25.

As mentioned above, it is possible to provide the interface apparatus in which data is normally transferred between a plurality of devices which are asynchronously operated irrespective of the periods of operating clocks of the devices.

What is claimed is:

1. An interface apparatus comprising:
   a pulse generating unit which detects the change of reading target data and generates a start pulse;
   an adjusting unit which generates an adjusting signal that changes from a first signal level to a second signal level in response to said start pulse generated by said pulse generating unit;
   a register unit comprising a data holding register which fetches first reading target data synchronously with a clock that is externally supplied when said adjusting signal is at said second signal level, and holds said reading target data and outputs it as second reading target data when said adjusting signal is at said first signal level; and a driver unit which outputs said first reading target data synchronously with a reading signal that is asynchronous with said clock when said adjusting signal is at said second signal level, and outputs said second reading target data synchronously with said reading signal when said adjusting signal is at said first signal level.

2. The interface apparatus according to claim 1, wherein said adjusting unit extends a period in which said adjusting signal is at said second signal level in accordance with a period in which said reading signal is active.

3. The interface apparatus according to claim 1, wherein said pulse generating unit generates said start pulse in response to the change of a reading target data updating signal indicating that said reading target data is changed, which is externally sent synchronously with said clock.

4. The interface apparatus according to claim 1, wherein said adjusting unit comprises:
 a two-input OR gate which receives said start pulse to one input terminal thereof;
 a first flip-flop with a reset terminal which fetches and stores a signal supplied to a data input terminal from said two-input OR gate synchronously with said clock and supplies a signal outputted from an output terminal to another input terminal of said two-input OR gate; and
 a second flip-flop which receives an inverse signal of said reading signal to an enable input terminal, fetches and stores a signal supplied to a data input terminal from an output terminal of said first flip-flop synchronously with said clock, outputs said adjusting signal from an output terminal, and supplies said adjusting signal to said reset terminal of said first flip-flop.

5. The interface apparatus according to claim 1, wherein said adjusting unit comprises:
 a JK flip-flop which receives said clock by a clock input terminal thereof and receives said start pulse by a J input terminal thereof; and
 a flip-flop which receives an inverse signal of said reading signal to an enable input terminal, fetches and stores a signal supplied to a data input terminal from an output terminal of said JK flip-flop synchronously with said clock, outputs said adjusting signal from an output terminal, and supplies said adjusting signal to a K input terminal of said JK flip-flop.

6. The interface apparatus according to claim 1, wherein said register unit further comprises:
 a data writing register which fetches reading target data that is externally supplied synchronously with said clock, holds said reading target data and outputs it as said first reading target data.

7. An interface apparatus set between a peripheral device and a bus, comprising:
 an adjusting unit which generates an adjusting signal that changes from a first signal level to a second signal level in response to a start pulse inputted from said peripheral device;
 a register unit comprising a data holding register which fetches first reading target data synchronously with a clock that is supplied from said peripheral device when said adjusting signal is at said second signal level, and holds said first reading target data and outputs it as second reading target data when said adjusting signal is at said first signal level; and a driver unit which outputs said first reading target data synchronously with a reading signal that is externally supplied asynchronously with said clock when said adjusting signal is at said second signal level, and outputs said second reading target data synchronously with said reading signal when said adjusting signal is at said first signal level.

8. The interface apparatus according to claim 7, wherein said adjusting unit extends a period in which said adjusting signal is at said second signal level in accordance with a period in which said reading signal is active.

9. The interface apparatus according to claim 7, wherein said peripheral device comprises a peripheral device which is operated synchronously with said clock, and
 said adjusting unit inputs a register updating signal for instructing an updating operation of storage contents of said peripheral register as said start pulse.

10. The interface apparatus according to claim 7, wherein said peripheral device has a timer function, and
 said adjusting unit inputs a count-up signal of a timer which is outputted by said peripheral device as said start pulse.

11. The interface apparatus according to claim 7, wherein said adjusting unit comprises:
 a two-input OR gate which receives said start pulse to one input terminal thereof;
 a first flip-flop with a reset terminal which fetches and stores a signal supplied to a data input terminal from said two-input OR gate synchronously with said clock and supplies a signal outputted from an output terminal to another input terminal of said two-input OR gate; and
 a second flip-flop which receives an inverse signal of said reading signal to an enable input terminal, fetches and stores a signal supplied to a data input terminal from an output terminal of said first flip-flop synchronously with said clock, outputs said adjusting signal from an output terminal, and supplies it to said reset terminal of said first flip-flop.

12. The interface apparatus according to claim 7, wherein said adjusting unit comprises:
 a JK flip-flop which receives said clock by a clock input terminal and receives said start pulse by a J input terminal; and
 a flip-flop which receives an inverse signal of said reading signal to an enable input terminal, fetches and stores a signal supplied to a data input terminal from an output terminal of said JK flip-flop synchronously with said clock, outputs said adjusting signal from an output terminal, and supplies said adjusting signal to a K input terminal of said JK flip-flop.

13. The interface apparatus according to claim 7, wherein said register unit further comprises:
 a data writing register which fetches reading target data that is supplied from said peripheral device synchronously with said clock, holds said reading target data and outputs it as said first reading target data.

14. The interface apparatus according to claim 13, wherein said peripheral device has a communication function, and
 said adjusting unit inputs a signal indicating the completion of reception which is outputted by said peripheral device as said start pulse.

* * * * *